Oct. 5, 1965        E. J. CHRISTOPHER         3,209,719
                 SURFACE PROPELLING SYSTEM
Filed March 1, 1963                      3 Sheets-Sheet 1
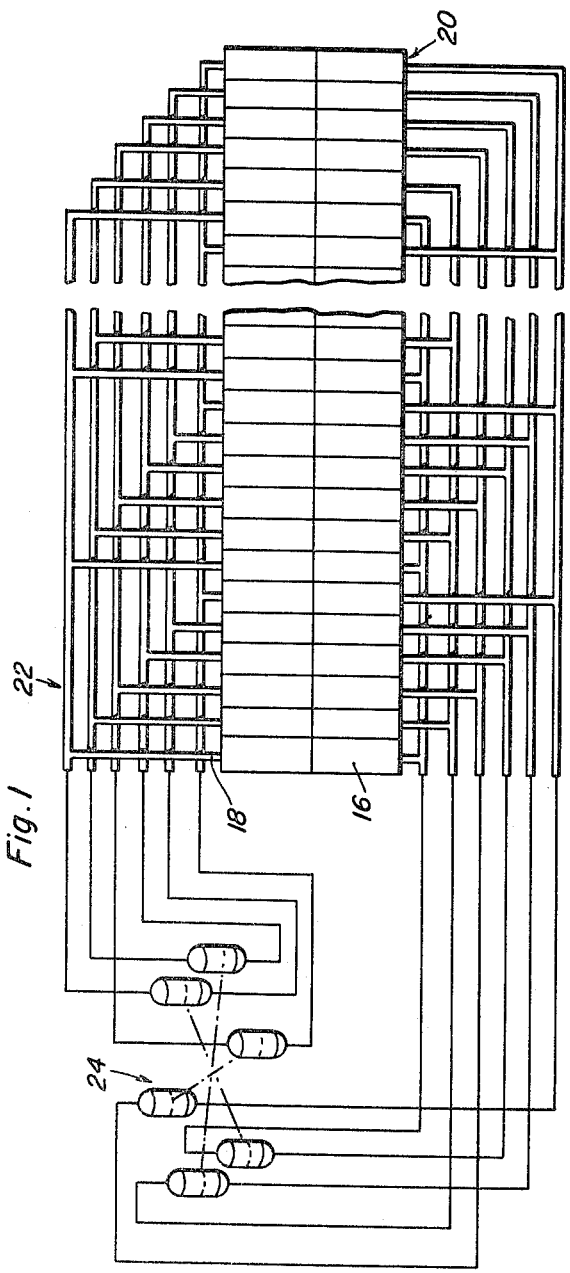
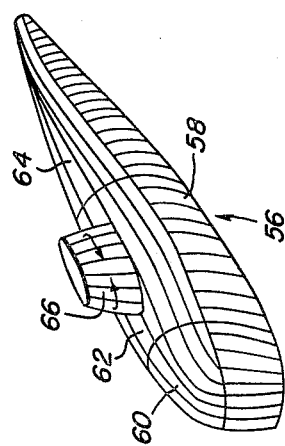
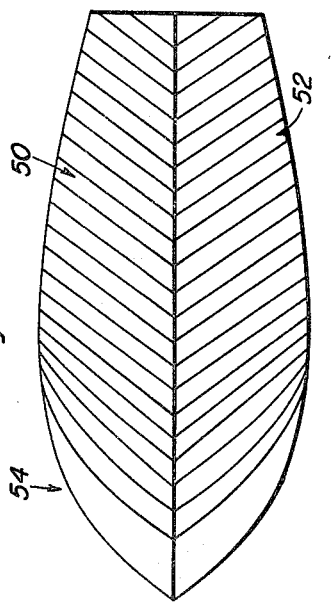
Eugene J. Christopher
          INVENTOR.

Oct. 5, 1965  E. J. CHRISTOPHER  3,209,719
SURFACE PROPELLING SYSTEM
Filed March 1, 1963  3 Sheets-Sheet 2
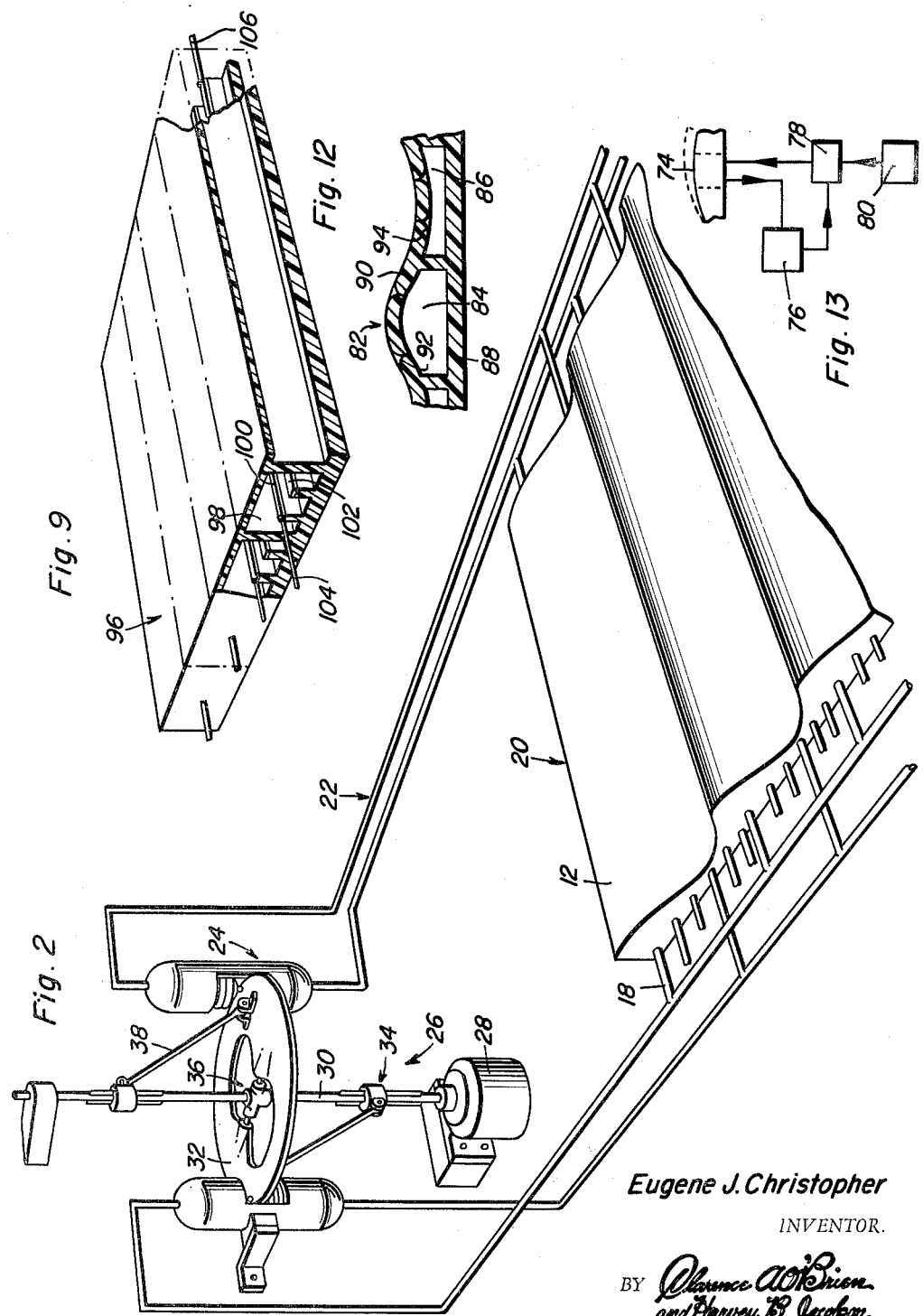
Eugene J. Christopher
INVENTOR.

Oct. 5, 1965     E. J. CHRISTOPHER     3,209,719
SURFACE PROPELLING SYSTEM
Filed March 1, 1963     3 Sheets-Sheet 3
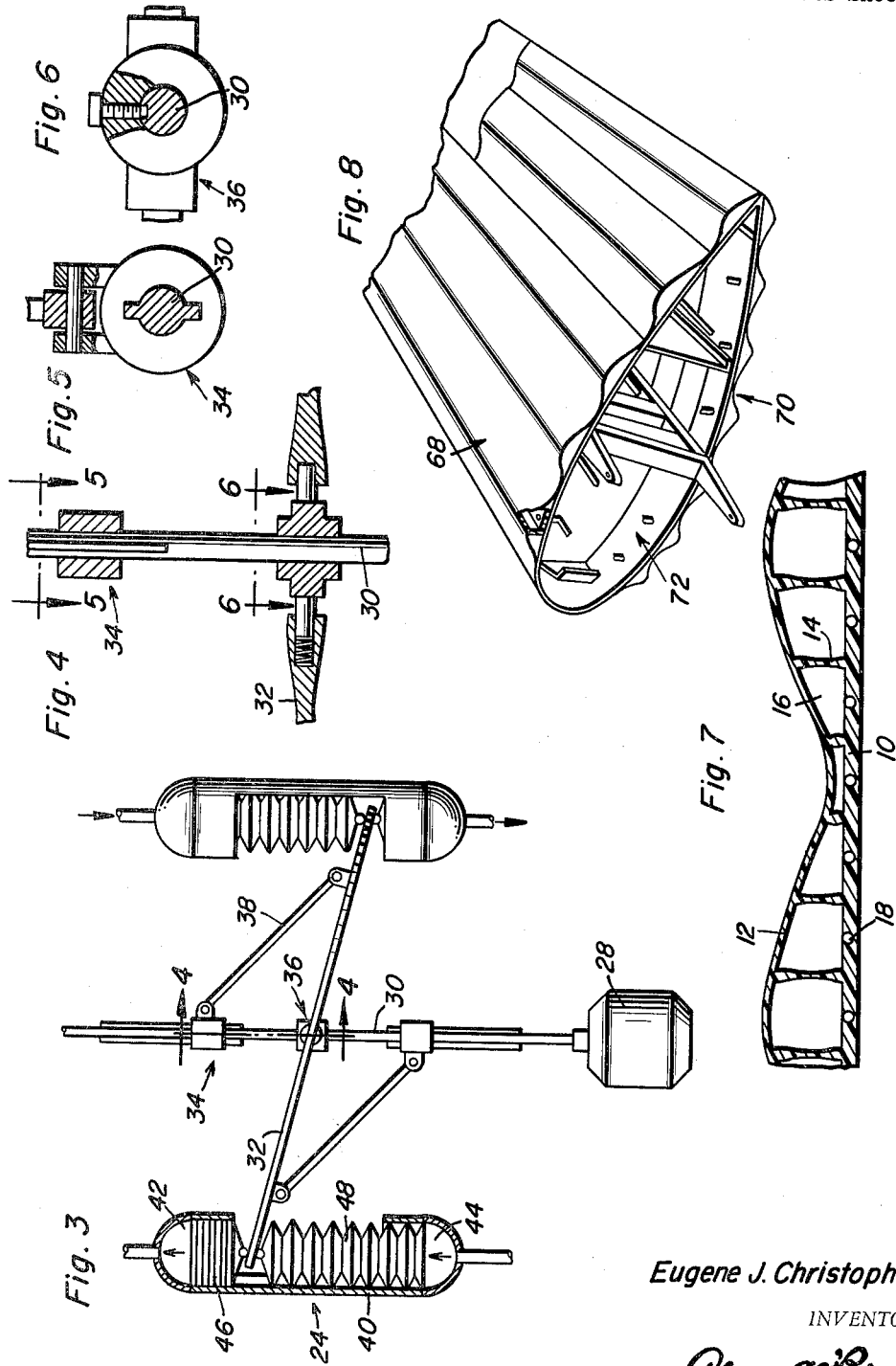
Eugene J. Christopher
INVENTOR.

United States Patent Office 3,209,719
Patented Oct. 5, 1965

3,209,719
SURFACE PROPELLING SYSTEM
Eugene J. Christopher, 3411 SW. 35th St.,
Hollywood, Fla.
Filed Mar. 1, 1963, Ser. No. 261,976
8 Claims. (Cl. 115—.5)

This invention relates to novel apparatus or structure and associated systems concerned with variation in external surfaces for different purposes. More particularly, the present invention relates to variation in an external surface exposed to a fluid medium.

One important object of the present invention is to provide a new method for propelling a craft or vehicle through a fluid medium such as water by directional change in the external surface of the craft or vehicle producing a surface wave motion.

Another object of the present invention is to provide surface control facilities whereby the attitude or direction of a craft or vehicle may be controlled while being propelled through a fluid medium.

An additional object of the present invention is to provide surface control facilities for a vehicle or craft being propelled through a fluid medium whereby fluid turbulence and other pressure variations encountered in the fluid medium may be compensated for so as to reduce or eliminate any disturbing effect on the vehicle or craft. Accordingly, the affects of winds, explosions, etc. on air or underwater crafts may be coped with.

A still further object of the present invention is to provide a surface changing structure for underwater crafts whereby marine growth on such surfaces may be discouraged.

Other objects of the present invention also include the provision of surface varying facilities for airfoils whereby aerodynamic lift on aircraft may be enhanced or controlled for lift or descent purposes.

In accordance with the foregoing objects, the structure encompassed by the present invention involves a plurality of expansible chambers through which the surface exposed to the fluid medium may be varied or changed. The chambers may therefore be expanded and contracted by supply and exhaust of fluid under pressure thereto from a fluid generator under valve control. Electronic controls may also be utilized in which case the chambers would be filled with an electrostrictive gas with control charges being applied to the gas through electrodes also positioned within the chambers. The electronic controls may therefore include such components as pulse generators, phase inverters, switches, transistors, etc. through which the gas in the chambers may be controllably expanded or contracted. Thermodynamic control systems are also contemplated whereby expansion and contraction of gas within the aforementioned chambers may be achieved through use of thermal or refrigeration cycles utilizing refrigerants such as Freon and carbon dioxide. As a further method for varying the expansion and contraction of the aforementioned chambers, a closed fluid circuit may be utilized for transferring pressure between the chambers by a valve control system.

From the foregoing objects, it will be appreciated that external surfaces exposed to a fluid medium may be varied in a controlled manner depending upon the purpose and functions to be achieved. Accordingly, pulse generating apparatus may be utilized to effect cyclic variations in amplitude and frequency so as to produce a wave motion on the external surface. The displacements in the external surface may therefore assume for example a sinusoidal function or modications thereof for craft propelling purposes and attitude and steering control purposes. Frequency and amplitude controls may therefore be associated with such equipment in order to control the rate of change in the surface displacements. The external surface displacement may also assume a vibratory character and hence be suitable for orthopedic support in connection with shock absorbing seats for example. Variation in the external exposed surface may also be produced in response to pressure variations in the fluid medium as a compensatory measure in connection with fluid turbulence and shock waves in the fluid medium as aforementioned.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatic illustration of apparatus made in accordance with and for the purposes of the present invention.

FIGURE 2 is a perspective view of a portion of the apparatus as diagrammatically shown in FIGURE 1.

FIGURE 3 is a front elevational view of a portion of the apparatus illustrated in FIGURE 2 with parts shown in section.

FIGURE 4 is a partial sectional view taken substantially through a plane indicated by section line 4—4 in FIGURE 3.

FIGURE 5 is a transverse sectional view taken substantially through a plane indicated by section line 5—5 in FIGURE 4.

FIGURE 6 is a transverse sectional view taken substantially through a plane indicated by section line 6—6 in FIGURE 4.

FIGURE 7 is a partial sectional view through the external surface varying portion of the apparatus illustrated in FIGURES 1 and 2.

FIGURE 8 is a partial perspective view showing adaptation of the structure to an airfoil.

FIGURE 9 is a partial perspective view with parts shown in section of another form of surface varying structure in a neutral state.

FIGURE 10 is a bottom plan view of a water surface craft to which the structure of the present invention is applied.

FIGURE 11 is a perspective view of a submarine type of underwater craft providing another installation of the novel structure of the present invention.

FIGURE 12 is a partial sectional view of a still further modification of the surface varying structure particularly suited for orthopedic supporting purposes.

FIGURE 13 is a diagrammatic illustration of another use to which the surface varying structure of the present invention may be applied.

The basic principle which underlies the structure and associated systems of the present invention involves silent variation in the external skin or surface of a vehicle, craft or like device which is exposed to a fluid medium including liquid and gas such as water or air. As more clearly seen in FIGURE 7, the surface varying structure includes an inner member 10 which may form a portion of the external structure of a vehicle or vessel for example which is exposed to the fluid medium through which it is propelled. The inner member 10 therefore conforms to the general contour of the vehicle and is relatively non-deformable as compared to an outer elastically deformable member or membrane 12 which is spaced from but generally conforms to the inner member 10 and presents a continuous surface to the fluid medium. A plurality of interconnecting walls 14 are therefore provided in spaced relation to each other, said walls being interconnected with the inner member 10 and the outer member 12 for variable spacing therebetween. Between each of the connecting walls 14, a fluid chamber 16 is formed. Means are therefore provided for expanding and contracting the chambers 16 in a direction perpendicular to the inner member 10 whereby the external membrane surfaces presented by the continuous outer member 12, may be varied from a shape parallel to the inner member 10 to a travelling wave-like shape such as illustrated in FIGURE 7. Each of the chambers 16 is therefore elongated in parallel directions and as illustrated in FIGURE 7, expansion and contraction of these chambers may be controlled through a plurality of fluid passages 18 which are formed in the inner member 10 and respectively communicate with the chambers 16 for supply and exhaust of fluid pressure from the chambers in order to effect expansion and contraction thereof.

Referring now to FIGURES 1 and 2, one section of a surface varying structure 20 is illustrated, this structure 20 being formed cross-sectionally as illustrated and described in connection with FIGURE 7. A group of elongated chambers 16 may therefore form a cyclic unit, six of such chambers forming a group as illustrated in FIGURES 1 and 2. Accordingly, a plurality of fluid conduits 22 are interconnected with corresponding fluid passages 18 of each cyclic group in order to simultaneously control the pressure and expansible conditions of one chamber in each cyclic group. The conduits 22 are therefore arranged so that a pair thereof are interconnected with the same corresponding chamber in each cyclic group so as to form therewith a closed fluid circuit operatively connected with one of a plurality of fluid pressure generators 24. The fluid pressure generators 24 are therefore operated and controlled by a pressure varying mechanism generally referred to by reference numeral 26 whereby the pressures in the chambers 16 may be cyclically varied in order to elastically deform the exposed surface 12 of the variable surface section 20 in order to produce a wave motion on the surface having a sinusoidal or any other suitable characteristic.

Referring now to FIGURES 2, 3, 4, 5 and 6, it will be observed that the pressure varying mechanism 26 includes a source of motive energy such as an electric motor 28 having an output shaft 30 to which a wobble plate 32 is connected for rotation therewith. The tilt of the wobble plate 32 may therefore be varied by means of the tilt adjusting devices 34 slidably mounted on the shaft 30. The wobble plate 32 is therefore pivotally connected to the shaft 30 by the pivot assembly 36 and is interconnected to the tilt adjusting devices 34 by the links 38. The peripheral rim portions of the wobble plate 32 are received within the hydrostatic pressure generators 24 so that upon rotation of the shaft 30 with the wobble plate at a varied tilt, the pressure generators will produce variable discharge and suction pressures at opposite ends thereof, the amplitude of the variation in pressures depending upon the angle of tilt to which the wobble plate is adjusted. The frequency of the cyclic variation in pressures on the other hand, will depend upon the rotational speed of the motor 28. In this manner, both amplitude and frequency in the expansion and contraction of the fluid chambers 16 may be controlled. Each of the fluid generators may therefore take the form of a fixed cylinder 40 having pressure communicating cavities 42 and 44 at opposite ends thereof by means of which the conduits 22 are supplied with either discharge or suction pressure. The pressure cavities 42 and 44 therefore communicate with a pair of bellows 46 and 48 which are contracted and expanded by the wobble plate 32 engaging the adjacent closed ends thereof. The wobble plate 32 may thereby operate any number of pressure generators 24 depending upon the number of fluid chambers forming a cyclic group since each fluid generator will vary the pressure in one fluid chamber 16 from each cyclic group regardless of the number of such cyclic groups. It should also be appreciated, that the closed fluid circuit described may include pressure regulators and pressure modifying equipment whereby the wave motion imparted to the surface 12 may be modified as desired. It will therefore be appreciated, that a surface varying section such as the section 20 when mounted on a craft may be effective to propel the craft through a fluid medium in the direction in which the wave motion imparted to the surface 12 progresses. Accordingly, directional control of the motor 28 will also constitute a directional control for the propelling system. The speed of rotation of the motor 28 on the other hand, will control the rate of propulsion as aforementioned while the tilt of the wobble plate 32 will control the propelling force.

Two surface propelling sections 50 and 52 may therefore be mounted on the bottom of a water surface craft 54 as shown in FIGURE 10, these surface varying sections 50 and 52 being controlled in a manner similar to that described with respect to FIGURES 1 through 7. It will be observed, that the fluid chambers forming the surface varying sections 50 and 52 form an angle with each other so that the craft propelling action of each of the variable surface sections will be directed at an angle to each other in order to achieve directional stability in propelling the craft 54. It will also be appreciated, that the pressure varying system associated with each of the surface varying sections 50 and 52 may be operated independently of each other so as to obtain differential control over the propelling action as to direction, frequency and amplitude in order to steer the craft as it is being propelled.

In FIGURE 11, a submarine type of underwater craft 56 is illustrated and is shown mounting a plurality of varying surface sections, including a pair of side sections 58, forward top section 60, intermediate top section 62, aft top section 64 and a section 66 encircling the conning tower of the submarine craft. The direction of the elongated chambers associated with each of the surface varying sections will be different so that some of the sections will be operative simultaneously to propel the craft and differentially to control steering and attitude of the craft. Other of the sections will be operative in cooperation with the other sections to control the attitude of the craft with respect to the three perpendicular axes extending through the craft. For example, directional control over the action of the section 66 will produce movement of the craft about a vertical axis while the top sections 60, 62 and 64 will be useful in controlling angular displacement about a longitudinal axis through the craft. Differential control over the other sections will also produce angular displacement about a transverse axis through the craft. It will therefore be apparent, that the proper placement of the surface varying sections with the direction of the elongated chambers thereof properly related, will provide facilities for both propelling, steering and attitude control over underwater craft.

Installation and adaptation of surface controlling sections 68 and 70 to an airfoil member such as an aircraft wing 72 is shown in FIGURE 8. Accordingly, the number of elongated parallel chambers associated with a cyclic group in the section 68 may be different from that of section 70 in order to produce characteristically different wave lengths in the respective sections in addition to a difference in the frequency and amplitude of the wave motion. The control facilities whereby the elongated chambers are expanded and contracted may therefore be designed so as to vary the shape of the different portions of the airfoil assembly 72 in order to either enhance lift or control descent of the aircraft with which the airfoil assembly is associated. Also, the variation in the shape and surface of the surface varying sections associated with an aircraft, will be useful in connection with boundary layer control and in order to provide means to compensate for air turbulence, air pockets, explosions and other abrupt and random variations in the fluid medium pressure that could have a disturbing effect on the aircraft. Referring therefore to FIGURE 13, it will be observed that a variable surface section 74 of a vehicle or craft whether it be an aircraft or an underwater craft, may be varied in shape as hereinbefore described in response to pressure variations in the fluid medium through which the craft is being propelled. Accordingly, the forces applied to an incremental section of the surface varying portion 74 will be sensed by a pressure responsive device 76 supplying a control signal to a control valve system 78 whereby expansion or contraction of the incremental section of the surface varying portion 74 may be varied accordingly by the fluid supply system 80. Thus, the system diagrammatically illustrated in FIGURE 13, may be used to control the variable surface portion of the craft to cancel the effect of disturbances in the fluid medium on the craft this being achieved either independently of the use of the surface varying portion as a propelling means or in concert therewith by modifying the propelling action thereof. It will also be appreciated, that the variable surface section may be controlled so as to impart a vibratory movement thereto of a non-propelling nature. This may be particularly useful in connection with underwater craft for the purpose of discouraging marine growth. It will therefore also be apparent, that a surface varying section to which a purely vibratory action is imparted, may be useful as an orthopedic supporting mat which would be particularly adaptable for alleviating pilot or driver fatigue. When utilized for such purposes, a surface variation in the mat may be achieved by valve control transferring fluid under pressure from expanded chambers to contracted chambers.

Referring therefore to FIGURE 12, it will be observed that a surface varying section 82 may include alternately expanded and contracted chambers 84 and 86 formed between the inner member 88 and the outer supporting member 90. In this form of surface varying section 82, one set of chambers 84 may include tapered apertures 92 operative to close upon expansion of the chamber when fluid under pressure is transferred thereto. Suction pressure applied to the chambers 86 for contraction thereof may also be effective to seal the oppositely tapered apertures 94 associated with the chambers 86. Accordingly, a pulsating discharge pressure may be applied to the chambers 84 simultaneously with a pulsating suction pressure applied to the chambers 86 in order to produce the desired vibration. The oppositely directed tapered apertures 92 and 94 will be operative to limit the contraction of the chambers 84 and expansion of the chambers 86.

It will be apparent from the foregoing, that control over the expansion and contraction of the elongated fluid chambers by means of which the external surface of the surface varying section may be formed or varied, can be achieved either by connection of hydrostatic fluid generators to the chambers or by valve controlled transfer of fluid under pressure therebetween. Expansion and contraction of the chambers may however also be controlled electrically. Referring therefore to FIGURE 9, it will be observed that a surface varying section 96 is illustrated having a plurality of parallel elongated gas confining chambers 98 within which an electrostrictive gas is confined. A pair of electrodes 100 and 102 are mounted within each of the chambers 98 having electrical leads 104 and 106 connected thereto through which the gas within the chambers 98 may be controllably charged. The gas is therefore of a type which will expand under charge of a predetermined potential between the electrodes 100 and 102 and contract upon removal of the potential difference. The molecular action resulting in such increase in pressure of the gas, is a phenomenon that has already been observed and proposed for use in connection with propulsion engines of a different type; see pages 42–45, May 1960 issue of "Space/Aeronautics." The expansion and contraction of the chambers in order to produce the different changes in shape of the surface varying section as aforementioned may therefore be controlled electronically through pulse generators operatively connected to the electrodes 100 and 102 through the leads 104 and 106. The chambers may also be expanded and contracted in a controlled manner by thermodynamic facilities including heat exchangers and compressors through which refrigerants may be cycled before introduction to and discharge from the elongated chambers of the surface varying section.

From the foregoing description, the construction, utility, purposes and operational principles underlying the present invention will be appreicated. It will therefore be apparent that the surface varying structures of the present invention will have many uses in connection with operation of vehicles through fluid mediums including propulsion thereof, attitude control thereof, steering and may cooperate aerodynamically with aircraft surfaces to compensate for and reduce structure weakening effects on the aircraft produced for example by turbulent air and other aerodynamic phenomena that could be the cause of aircraft disasters. The surface varying structure described will also be suitable for any desired vehicle surface contour and hence adaptable for surface portions of submarines, boat hulls, pontoons of seaplanes, etc. The character of the surface movement may also be varied in connection with propelling purposes in order to achieve the most desirable thrust action. Use of the surface varying structure as a shock absorbing mattress would also contribute to the utility of the present invention.

In accordance with the foregoing uses to which this invention is applicable, the surface controlling structure may be ported for controlled leakage of air when used as the fluid medium, for ventilation and temperature regulation of a passenger compartment. Compensating controls will accordingly be needed for such purposes. Where external sensing controls are utilized, such as strain gauges, computer programming equipment could be operatively connected to the pressure varying control system to provide disturbance sensing overcontrol on the craft propelling motion. Thus, disturbances may be cancelled by a modified wave action of the surface or the surface could be pressurized at the stress areas to prevent shock wave build-up by providing a damping effect. Also, sections of the varying surface could be modified for more precise attitude control by using smaller clusters of expansion chambers arranged to produce wave motion in circular or arcuate patterns as well as in angularly variable radial patterns. It should also be appreciated that the various different control features herein before described either specifically or broadly could be interchanged and/or combined in any particular installation in order to take advantage of the functions realized by these features, all such possible combinations being contemplated as part of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pressure variable surface device adapted to be exposed to a liquid medium comprising, an inner rigid member defining a predetermined continuous surface, an outer elastically deformable member spaced from said inner member defining a continuous varying surface exposed to the liquid medium, means interconnecting said inner and outer members to form a plurality of fluid pressure chambers therebetween and hydrostatic expansion means operatively connected to said chambers to vary the shape and motion of the continuous surface of the outer member to that of a travelling wave.

2. A pressure variable surface device adapted to be exposed to a fluid medium comprising, a rigid inner member defining a predetermined continuous surface, an outer elastically deformable member spaced from said inner member defining a continuous varying surface exposed to the fluid medium, means interconnecting said inner and outer member so as to form a plurality of chambers therebetween, and expansion means operatively connected to said chambers to vary the shape and motion of the continuous surface of the outer member to that of the travelling wave, said expansion means comprising, an electrostrictive gas in each of said chambers, and electrode means mounted in said chambers for applying charges to said gas for expansion thereof.

3. A pressure variable surface device adapted to be exposed to a fluid medium comprising, a rigid inner member defining a predetermined continuous surface, an outer elastically deformable member spaced from said inner member defining a continuous varying surface exposed to the fluid medium, means interconnecting said inner and outer member so as to form a plurality of chambers therebetween, and expansion means operatively connected to said chambers to vary the shape and motion of the continuous surface of the outer member to that of the travelling wave, aperture means formed in said outer memebr operative to seal said chambers in response to deformation of the outer member in one direction.

4. The combination of claim 1 wherein said chamber variation means includes, pressure responsive control means for varying the shape of the outer member in accordance with variations in pressure of the fluid medium to which the outer member is exposed.

5. A system for propelling a craft through a fluid medium comprising, an external surface portion mounted on the craft exposed to said fluid medium, said external surface portion comprising, an inner rigid member defining a predetermined continuous surface, an outer elastically deformable member spaced from said inner member and defining a continuous varying surface, means interconnecting said inner and outer members to form a plurality of chambers therebetween arranged in a pattern parallel to said predetermined continuous surface, and hydrostatic means operatively connected to said chambers for variation in the expansion and contraction of said chambers to thereby vary the shape of the continuous surface of the outer member exposed to the fluid medium, including control means for controlling the expansion and contraction of each chamber at a cyclically variable function in predetermined phase relation to each other for producing a travelling wave motion of said continuous surface.

6. In an aircraft having an airfoil, an inner rigid member forming a fixed airfoil shape for said airfoil, outer elastically deformable portions mounted in spaced relation to said inner member to form a variable airfoil shape, means interconnecting said outer portions with said inner member to form elongated chambers therebetween, and means operatively connected to said chambers for cyclic expansion and contraction of the chambers associated with each of said outer portions at different frequencies and amplitudes to enhance aerodynamic lift on the airfoil.

7. In a marine craft having an external surface portion, said external surface portion comprising, an inner rigid member defining a continuous fixed surface, an outer elastically deformable member spaced from said inner member and defining a continuous varying surface, means interconnecting said inner and outer members to form a plurality of chambers therebetween elongated in one direction parallel to said continuous fixed surface, and means operatively connected to said chambers for variation in the expansion and contraction of said chambers varying the shape of the continuous surface of the outer member to discourage marine growth thereon.

8. A pressure variable surface device adapted for orthopedic support or the like comprising, an inner rigid member defining a predetermined continuous surface, an outer elastically deformable member spaced from said inner member defining a continuous supporting surface, means interconnecting said inner and outer members to form a plurality of fluid pressure chambers therebetween, and static pressure expansion means operatively connected to said chambers for cyclically varying the shape of the continuous supporting surface of the outer member at a vibration frequency to produce a travelling wave motion.

References Cited by the Examiner

UNITED STATES PATENTS

| 2,926,614 | 3/60 | Rose | 103—148 |
| 3,118,639 | 1/64 | Kiceniuk | 244—44 |
| 3,154,043 | 10/64 | Momsen | 115—0.5 |

FOREIGN PATENTS 562,822  4/44  Great Britain.

OTHER REFERENCES

"Boats," publication, March 1960, pages 32, 33 and 50.
Space/Aeronautics, pages 42–45, May 1960.

MILTON BUCHLER, *Primary Examiner.*

ANDREW H. FARRELL, *Examiner.*